United States Patent [19]

Gardner et al.

[11] 3,747,337
[45] July 24, 1973

[54] SPRING BRAKE SYSTEM WITH A CONSTANT FORCE SINGLE STROKE PUMPING MEANS

[75] Inventors: Delbert J. Gardner; Louis P. Rossigno; Leo H. McCormick, Jr., all of South Bend, Ind.

[73] Assignee: The Bendix Corporation, South Bend, Ind.

[22] Filed: Aug. 2, 1971

[21] Appl. No.: 168,226

[52] U.S. Cl. ............... 60/53.4, 188/170, 137/627.5, 137/557
[51] Int. Cl. ............................................. F15b 7/00
[58] Field of Search ........................... 60/54.5, 54.6; 188/170

[56] References Cited
UNITED STATES PATENTS

| 3,646,758 | 3/1972 | Cripe | 60/54.6 P |
| 3,617,096 | 11/1971 | Grabb | 303/9 |
| 3,390,921 | 7/1968 | Klimek | 303/56 |
| 3,201,176 | 8/1965 | Hager | 60/54.5 P |

FOREIGN PATENTS OR APPLICATIONS

| 765,079 | 1/1957 | Great Britain | 60/54.6 P |
| 573,144 | 3/1959 | Canada | 60/59.5 P |

Primary Examiner—Martin P. Schwadron
Assistant Examiner—A. M. Zupcic
Attorney—Leo H. McCormick, Jr.

[57] ABSTRACT

A power brake system for a parking brake having a hydraulically operated spring brake with a manual control. A single stroke pump responsive to a pressure differential created by the flow of a first and second fluid under pressure regulated by the manual control is capable of pressurizing hydraulic fluid. This pressurized hydraulic fluid is adapted to overcome the resiliency of the spring brakes to maintain the parking brake in a released position. A flow control device adjacent the manual control will assure that a constant differential pressure is maintained in the pump to stabilize the force of the pressurized hydraulic fluid. An indicator responsive to the pressure of the hydraulic fluid provides a visual indication of the operational mode of the spring brake to an operator.

3 Claims, 2 Drawing Figures

INVENTORS
DELBERT J. GARDNER,
LOUIS P. ROSSIGNO &
LEO H. McCORMICK JR.
BY Leo H. McCormick Jr.
ATTORNEY

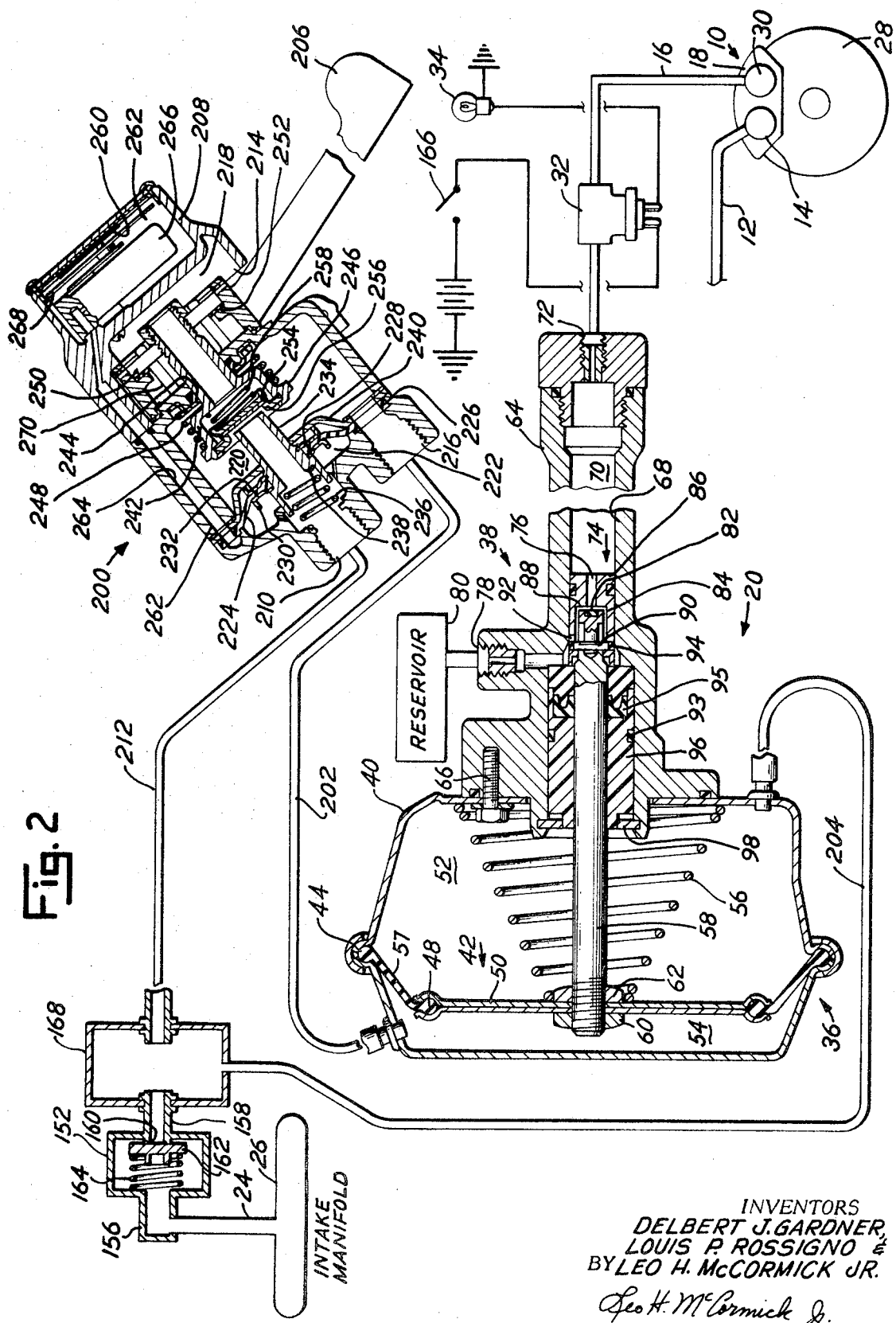

3,747,337

SPRING BRAKE SYSTEM WITH A CONSTANT FORCE SINGLE STROKE PUMPING MEANS

BACKGROUND OF THE INVENTION

Spring brakes have been proposed as one part of the dual braking systems in anticipation of the Federal Highway's Safety Laws. Initially, the spring brake was operated by an inversion valve connected to the same source of pressurized fluid used to operate the entire braking system. However, if this pressurized fluid were lost, the spring brakes would automatically be applied, as disclosed in U.S. Application No. 797,530, filed Feb. 7, 1969, now U.S. Pat. No. 3,599,761, and incorporated by reference. Later as disclosed in U.S. Application No. 28,483, filed Apr. 15, 1970, now U.S. Pat. 3,617,097, and incorporated by reference, a split full power braking system having a pump driven off the crankshaft was developed to independently supply the inversion valve with a pressurized fluid to operate the spring brakes. Still later as disclosed in U.S. Application No. 91,641 filed Nov. 23, 1970, now U.S. Pat. No. 3,703,077, and U.S. Application No. 126,020 filed Mar. 19, 1971, vacuum powered pumps were developed to conserve and reduce the number of potential devices operated by the power produced by crankshaft. In these vacuum pumping devices it is necessary to have storage vessels with a flow controlled inlet port to maintain the fluid force required to release the spring barke since these pumps modulated either automatically or manually until a predetermined hydraulic pressure for the system was achieved.

SUMMARY OF THE INVENTION

In internal combustion engines, a partial vacuum will normally be produced at the intake manifold. The intensity of this partial vacuum will be the greatest when the accelerator pedal is released, as during periods of braking and while the vehicle is stopped, and the least during periods of continual acceleration or pull up an incline. The intensity of the partial vacuum is directly related to the acceleration pedal whose position controls the intake air into the carburetor while the displacement of air by the pistons remains constant.

To best utilize the partial vacuum produced at the intake manifold in conjunction with a spring brake means used as a parking brake, we have devised a braking system with a manually controlled single stroke pump means that supplies a constant output force. The pump means consists of a housing having an internal cavity divided by wall means into a front chamber and a rear chamber. Piston means attached to the wall means is retained in a bore of a cylinder containing hydraulic fluid. The cylinder is connected to the spring brake means. A manual control has a first inlet port connected to air under atmospheric pressure, a second inlet port connected through flow control means to the intake manifold producing a partial vacuum and an outlet port connected to the front chamber. The rear chamber having air under atmospheric pressure being freely admitted through a filter at all times.

During a first mode of operation when it is desired to have the spring brakes applied, the first inlet port of the manual control is opened allowing air at atmospheric pressure to flow into the front chamber. With air at atmospheric pressure in both the front chamber and the rear chamber, a retainer spring moves the wall means and the connected piston means from a pressurizing position in the bore of the cylinder to thereby permit a resilient member to actuate the spring brakes. The spring brakes are normally used as a parking brake, but in the event of failure in service, the brakes could also be used as an emergency brake.

When an operator desires to release the spring brakes, the manual control is switched to the second mode of operation. In the second mode of operation the second inlet port is opened and the first inlet port closed. As the vehicle produces a partial vacuum at the manifold, the air in the front chamber is evacuated to create a pressure differential across the wall means. When the pressure differential reaches a predetermined value, the piston means will move in the bore of the cylinder and pressurize hydraulic fluid sufficiently to overcome the resilient member and release the spring brakes.

Once the maximum partial vacuum capable of being produced has evacuated the front chamber to create the pressure differential, flow control means in the partial vacuum supply conduit will prevent changes in this pressure differential caused by changes in the intensity of the partial vacuum produced. Thus, the pressurizing force exerted by the piston means will remain relatively constant.

Indicator means connected to receive a signal from a pressure responsive device will give an operator a visual indication of the hydraulic pressure in the system. In the first mode of operation a continual signal will be energized and in the second mode of operation the signal will be completely de-energized. As the hydraulic pressure in the system approaches the first mode of operation, an intermittent signal will alert the operator that the spring brakes are about to be activated.

It is therefore an object of this invention to provide an emergency and parking brake system with the means for releasing and applying spring brake means without graduation.

It is another object of this invention to provide a braking system having pumping means manually controllable to provide a constant pressurizing force from a single stroke.

It is still a further object to provide a braking system having a single stroke pumping means with means to give an operator an indication of the pressure of the operational fluid supplied spring brake means.

These and other objects will be readily recognized by those who read this specification and view the drawing.

BRIEF DESCRIPTION OF THE DRAWING

FIG. 2 shows a secondary embodiment of the braking system with control means for vacuum suspending the pumping means.

DETAILED DESCRIPTION OF THE PREFERRED EMBODIMENT

Figure 1:
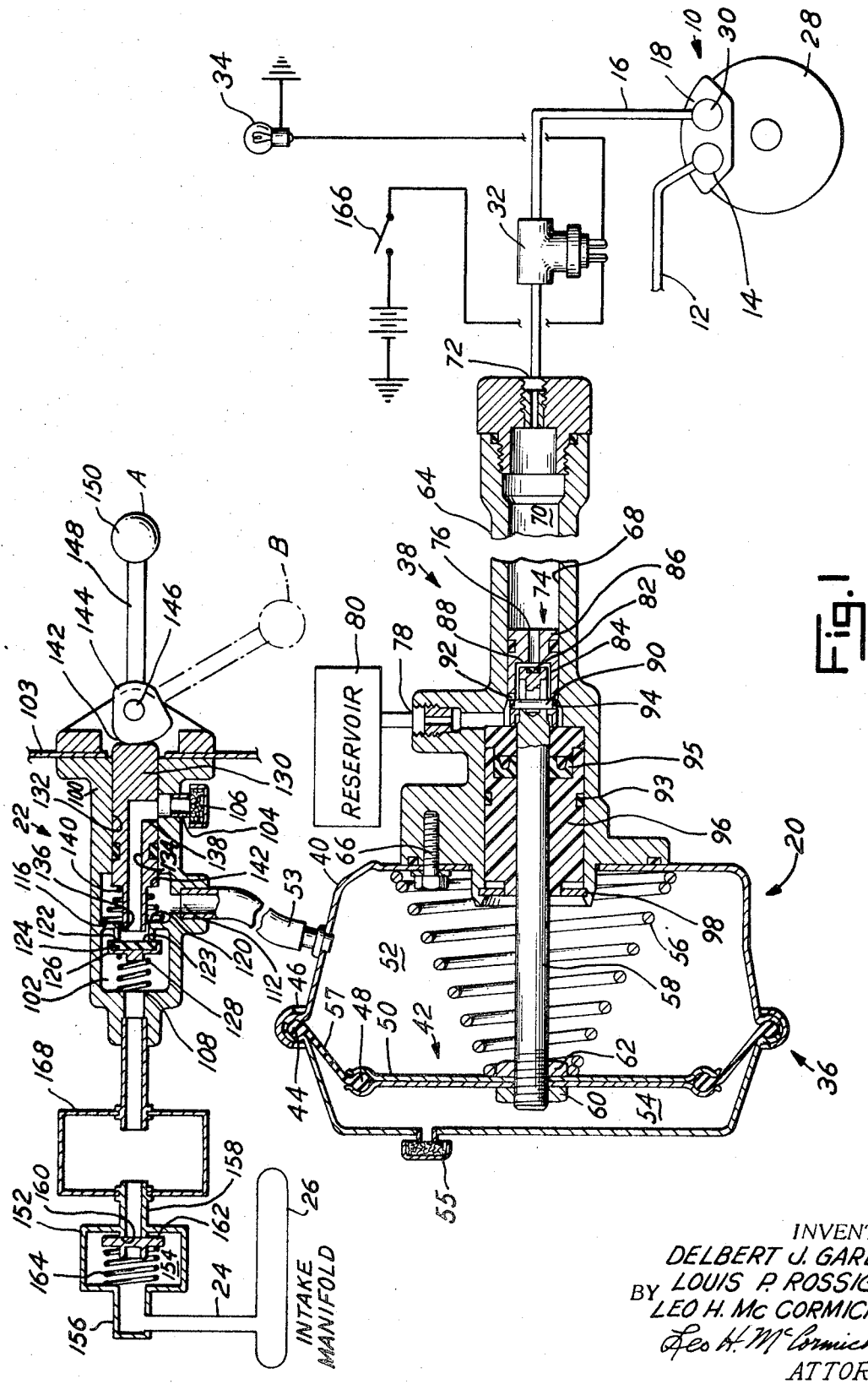
FIG. 1 shows an auxiliary braking system for operating a parking spring brake means with an enlarged sectional view of the control and pumping means used to provide the operational power.

In FIG. 1, a wheel brake assembly 10 is shown as receiving a first source of hydraulic fluid through conduit 12 for operating a service brake 14 and a second source of hydraulic fluid through conduit 16 for operating spring brake means 18 as described in copending U.S. Application No. 797,530. The power for operating the spring brake means 18 is derived from a vacuum operated pumping means 20 which is regulated by manual control means 22. The manual control means 22 is connected by a conduit 24 to the intake manifold 26 of a vehicle. When the manual control means 22 is in a first position (as shown in the drawing), a first mode of operation will exist where pumping means 20 will be de-energized. With pumping means 20 de-energized, the second source of hydraulic fluid will be unpressurized to thereby permit a resilient member (not shown) to activate the spring brake means 18. With the spring brakes activated, rotary motion between disc 28 and spring brake means 18 will be reduced because of the frictional drag between pad 30 and the disc 28.

After the vehicle has stopped and it is desired to move the vehicle, the manual control will be moved to a second position to commence a second mode of operation where the pumping means 20 is energized through vacuum produced at the manifold 26. Through energization of pumping means 20, the second source of hydraulic fluid will be pressurized and communicated through conduit 16 to the spring brake means 18.

A pressure switch 32 of a type fully described in copending U.S. Application Ser. No. 784,775, filed Dec. 18, 1968, now U.S. Pat. No. 3,593,265, and incorporated herein by reference, is located in conduit 16 between pumping means 20 and spring brake means 18. Switch 32 has an internal movable shaft (not shown) which is responsive to the hydraulic fluid pressure in the conduit 16. When the conditions for the first mode of operation are present in the braking system and the hydraulic fluid in conduit 16 unpressurized, the shaft will be moved by a spring to close an electrical contact switch which will cause an indicator device 34, either a warning light (as shown) which continually glows or flashes or an audible signal (not shown) to be energized for alerting an operator of this pressure condition. With the indicator 34 energized, an operator will be assured that the spring brakes will soon be activated. When the conditions for the second mode of operation are present, the hydraulic fluid pressure in conduit 16 will overcome the spring holding the shaft against the contact switch to thereby de-energize the indicator 34. When indicator 34 is de-energized, the operator will know the spring brakes have been released and the vehicle can be moved without damaging the wheel assembly 10.

In more particular detail, the vacuum operated pumping means 20 consists of a power transmitting section 36 an hydraulic fluid intensifying section 38 connected to the spring brake means 18 by conduit 16.

The power transmitting section 36 has a housing 40 with an internal cavity. A wall diaphragm means 42 has a first bead 44 held by an annular rib 46 in the housing 40 and a second bead 48 held to a stiff internal two-piece plate 50 which is clamped together to divide the cavity into a front chamber 52 and a rear chamber 54. The front chamber 52 is connected to the manual control means 22 by conduit 53 and the rear chamber 54 is connected to the atmosphere through filter 55. A flexible portion 57 located between the first and second beads 44 and 48 will permit the wall or diaphragm means 42 to be freely moved axially within the cavity. A resilient member 56 is concentrically located on plate 50 to surround a push rod 58 attached to plate 50. A pair of nuts 60 and 62 are threaded on the push rod 58 in such a manner as to hold the two piece plate 50 together. The push rod 58 extends through the housing 40 into the intensifying section 38 to transmit any force created by movement of the wall or diaphragm means 42 caused by a pressure differential between the front chamber 52 and the rear chamber 54, thereinto.

The fluid intensifying section 38 has a cylindrical body 64 attached to the housing 40 by bolts 66 (only one is shown). The cylindrical body 64 has an internal bore 68 located in an axially extending chamber 70 from which hydraulic fluid is forced through outlet port 72 by displacement piston means 74 attached to push rod 58. To replace the loss of hydraulic fluid in chamber 70 upon piston means 74 moving to the right, as shown in the drawing, to transmit pressurized hydraulic fluid to the spring brake means 18, a compensating port 76 is connected to inlet port 78 in communication with reservoir 80. The change in volume of fluid in chamber 70 could occur from loss of hydraulic fluid in the system. During power activation, the compensation port 76 is closed by a poppet member 82, retained in an enlarged section 84 of the piston 86, seating on shoulder 88. The push rod 58 to which poppet member 82 is attached, projects into the enlarged section 84 and is loosely fastened to the piston 86 by cross pin 90. The cross pin 90 is fixed to the push rod 58 but moves in a slotted section 92 on the piston 86. The length of the slotted section 92 is designed to permit the poppet member 82 to be unseated when the pin engages the rear end of the slot and seated on shoulder 88 at the front end of the slot. The cross pin 90 is prevented from coming loose by a snap ring 94 positioned in a groove on the outer surface of the piston 86 overlying the ends of cross pin 90. A guide bearing 96, retained by a snap ring 98, maintains push rod 58 in alignment with bore 68 in the intensifying section 38. Seals 93 and 95 surrounding bearing means 96 prevent hydraulic fluid from entering into the front chamber 52.

The manual control means 22 consists of a housing 100, which will be adapted to be mounted on the dashboard 103 of a vehicle (not shown), with an internal chamber 102 having a first inlet port 104 connected to the atmosphere through filter 106, a second inlet port 108 connected to a source of vacuum through conduit 24, such as the intake manifold 26 of an internal combustion engine and an outlet port 112 connected by conduit 53 to the front chamber 52 of the pumping means 20. A partition 116 separates the outlet port 112 from the second inlet port 108. The partition 116 has a central opening 120 surrounded by a seat 122. A rubber disc 124 is held in a retainer 126 and is urged against seat 122 by resilient means 128. A shaft 130, located in bore 132 connected to the internal chamber 102, has a concentric central bore 134 which extends from end 136 positioned in opening 120 of partition 116 to a point where a passage 138 is adjacently connected to the first inlet port. A resilient member 140 is held between the partition 116 and a shoulder 142 on shaft 130. The resilient member 140 urges shaft 130 against an eccentric face 142 and head 144 pivotally retained on pin 146. A shaft 148 is connected to head 144 with a knob 150 to enable an operator to move shaft 130 between a first and second operating position.

Check valve means 152 located between the intake manifold 26 and the second inlet port 108 has a flow chamber 154 with an inlet 156 and an outlet 158. A seal 160 surrounds the outlet 158 and a face member 162 is held against seat 160 by resilient member 164. Flow through the check valve means 152 is limited to a single direction, permitting only the partial vacuum created at the manifold to evacuate the front chamber 52 when the manual control means 22 is in the second mode of operation. Thus, once the front chamber 52 has been evacuated by the maximum partial vacuum capable of being produced at the manifold 26, further flow through the check valve means 152 is restricted. The pressure differential across the wall means 42 will now be uneffected by changes in the level of the partial vacuum produced and a constant output force will successively be re-produced for providing the power to hold the pad 30 of the spring brake 18 out of contact with disc 28.

MODE OF OPERATION OF THE PREFERRED EMBODIMENT

When an operator turns on the ignition switch 166 of the vehicle, if, after the vehicle has been stopped for a period of time, the hydraulic pressure in the supply conduit 16 going to the spring brake means 18 is below a predetermined value, the indicator 34 will give a signal to alert the operator of this condition.

If the loss of hydraulic pressure has occurred because of an accidental loss of vacuum from the front chamber 52 as when the manual control for the spring brake means was not placed in the first mode of operation it will be necessary for the partial vacuum produced at the manifold to establish the operational pressure differential. In this position manual control means 22 will hold shaft 130 against face 123 of the seal for the second inlet port 108 by eccentric face 142 being positioned by knob 150 as shown by the dashed lines at B. Once the intake manifold begins to produce sufficient partial vacuum the front chamber 52 will be evacuated and the operational pressure differential established across wall means 42. This pressure differential will move piston means 86 in bore 68 to pressurize the hydraulic fluid therein which will overcome the resilient bias of the shaft (not shown) of the switch 32. Switch 32 will, in turn, terminate the signal emitted from indicator 34. When the signal from indicator 34 stops, the operator will know it is safe to move his vehicle without the pads 30 of the spring brake means 18 engaging disc 28.

If the spring brake means 18 are applied upon turning the ignition switch 166 to the ON position, the hydraulic fluid pressure in conduit 16 will approach zero. When the engine of the vehicle has started to produce partial vacuum at the manifold 26, the operator will move the manual control knob 150 from position A to position B. As the control knob 150 moves from the first mode of operation at position A to the second mode of operation at position B, head 144 pivots on pin 146 and causes the eccentric face 142 to slide shaft 130 into engagement with face 124 of the seal 123. With the tubular end of shaft 136 held against face 124, passage of air at atmospheric pressure through the first inlet 104 is stopped and face 124 lifted off seat 122 to open first inlet port 108. The partial vacuum produced at the manifold communicated through check valve means 152 can now evacuate the air from the front chamber 52. With partial vacuum in the front chamber 52 and air at atmospheric pressure in the rear chamber 54, a pressure differential will be produced across wall means 42. This pressure differential will move the piston means 86 attached to wall means 42 to pressurize the hydraulic fluid in chamber 70. When the piston means 86 reaches the bottom of its stroke sufficient hydraulic pressure will be produced to release the spring brake means 18. Check valve means 152 will hold the maximum partial pressure produced at the manifold 26 in the front chamber 52 to create a relatively constant pressure differential across wall means 42. The flexible portion 57 will permit the piston means 74 attached to the wall means 42 to move in bore 68 with changes in temperature which effects the space volume of the hydraulic fluid. This corresponding movement between temperature changes and piston means 74 will maintain the pressurizing force holding the spring brake means 18 released within predetermined limits at all times.

When an operator wishes to apply the spring brake means, the knob 150 of the manual control means 22 is shifted to position A producing the first mode of operation. In this mode of operation, resilient means 140 will urge shaft 130 away from face 124 permitting seal 123 to be placed on seat 122 by resilient means 128. In this position air at atmospheric pressure enters through the first inlet port 104 into passage 138 and bore 134 past the tubular end of shaft 130 and out the outlet port 109. Since outlet 112 is connected by conduit 53 to the front chamber 52, wall means 42 is now suspended in atmospheric pressure permitting resilient means 56 to move piston means 86 from a pressurizing position. With the hydraulic fluid unpressurized, the spring brakes will be applied and the movement of the vehicle stopped.

In the event that the engine has stalled and it would be desirable to move the vehicle, a storage reservoir 168 can be placed in conduit 24 between the check valve means 152 and the second inlet port 108. The vacuum stored in this reservoir would permit several applications of the spring brake means to allow movement of the vehicle from one point to another after the engine has stopped without engagement of the spring brake means 18.

It will be understood that in the embodiment shown in FIG. 1, the outlet 112 of the manual control means 22 could be connected to the rear chamber 54 of the pumping means 20 and the front chamber 52 connected to air under atmospheric pressure as long as the second inlet 108 was connected to an air compressor (not shown). The air compressor being capable of raising the pressure of the first source of fluid above atmospheric pressure and the operation of the pumping means 20 would be the same since a pressure differential could be created across wall means 42 to move the piston means 86. By providing such a system with reservoir the air compressor could be operated on demand when the indicator 34 signaled the hydraulic fluid pressure was below a predetermined value.

In FIG. 2, elements that are the same as in FIG. 1 are designated with the same numeral and further description is not deemed necessary.

In the embodiment shown in FIG. 2, control means 200 alternately supplies air at atmospheric pressure and partial vacuum produced at the manifold 26 through conduit 202 to the rear chamber 54 of the vacuum operated pumping means 20 while the front chamber 52 is continually in communication through conduit 204 with the partial vacuum in reservoir 168. In a first mode of operation the manual control 206 of the control means 200 is positioned to permit partial vacuum in the rear chamber to vacuum suspend the wall means 52 and allow resilient means 56 to move piston means 74 releasing the pressurizing force on the spring brake means 10. With the pressurizing force removed, pads 30 will engage disc 28 to frictionally stop the vehicle. In a second mode of operation the manual control 206 permits air at atmospheric pressure into the rear chamber creating a pressure differential across the wall means 42 causing the piston means 74 to move and pressurize the hydraulic fluid to release the spring brake means 10.

In more particular detail, control means 200 consists of a housing 208 having an atmospheric chamber 218, a control chamber 220 and a partial vacuum chamber 222. A first inlet port 210 connects the partial vacuum chamber 222 with reservoir 168 through conduit 212. A second inlet port 214 freely permits air to the atmospheric chamber 218. An outlet port 216 connects the control means 200 to conduit 202 going to the vacuum operated pumping means 20.

A diaphragm 224 having an outer periphery 226 secured to the housing 208 has an inner periphery 228 held between a first diaphragm plate 230 and a second diaphragm plate 232 on tubular shaft 234. A spring 236 surrounds the first inlet port 210 and is held in recessed portion 238 of the tubular shaft 234. The spring 236, through the tubular shaft 234, urges the second diaphragm plate against a diaphragm restriction plate 240 which separates the partial vacuum chamber 222 from the control chamber 220 in addition to limiting the movement of the diaphragm 224.

A tubular valve stem 242 extends from the control chamber 220 through sealing surfaces 244 to the atmospheric chamber 218. A flange 246 on the end of the stem 242 in the control chamber provides a surface for holding spring 248. A cross pin 250 is adjustably secured by threads to a portion of stem 242 in the atmospheric chamber 218. The spring 248 urges cross pin 250 against a cam surface 252 on the manual control 206. A closure member 254 is resiliently positioned against annular seat 256 by spring 258. As shown in FIG. 2, the manual control 206 is positioned in the first mode of operation where partial vacuum from reservoir 168 is communicated to the partial vacuum chamber 222 through tubular shaft and into the control chamber 220. Since the control chamber is in communication with the rear chamber 54 of vacuum controlled pumping means 20 through outlet port 216, the wall means 42 will be suspended in a partial vacuum. With wall means 42 suspended in a partial vacuum, the spring brake means 10 will now be applied in the same manner as recited above in the mode of operation of FIG. 1.

The partial vacuum chamber 222 is connected to a Bourdon tube gage 266 located in chamber 262 by passage 264. An indicator 260 attached to the Bourdon tube, of a known type or with temperature compensating means as shown in U.S. Application No. 56,561, filed July 20, 1970 and incorporated by reference, will move with respect to dial 268 to give the operator a visual indication of the pressure differential producing capability across the wall means 42 as sensed by the level of partial vacuum produced at the manifold 26 and retained in reservoir 168.

When the manual control 206 is moved to the second mode of operation, cross pin 250 will slide on the cam surface 252 and move in slot 270 under the influence of spring 248. When the manual control 206 has been sufficiently moved, the closure member 254 will seat on the end of tubular shaft 234 closing the communication between the partial vacuum chamber 222 and the control chamber 220. Upon further movement of the manual control 206, the closure member 254 will move off annular seat 256 permitting air at atmospheric pressure to flow from the atmospheric chamber 218 to the control chamber 220. From the control chamber 220 the air at atmospheric pressure flows through the outlet port 216 by conduit 202 to the rear chamber 54 to create a pressure differential across the wall means 42. The pressure differential will move the piston means 74 to pressurize the hydraulic fluid and release the spring brake means 10 in the same manner as described above with reference to FIG. 1.

Through our braking systems we have provided a spring brake means with a simple operational power source with manual control thereby reducing cost and the number of parts to effectively operate a demand emergency and parking brake system.

We claim:

1. In a braking system for a vehicle having a hydraulically operated spring parking brake, manually controllable pumping means for continually supplying fluid at a constant pressure to release said spring parking brake in a first mode of operation and for eliminating said constant pressure to activate said spring brakes in a second mode of operation, said manually controllable pumping means comprising:

a first housing having an internal cavity therein;
wall means including a flexible portion for dividing said cavity into a front chamber and a rear chamber, said front chamber being connected to a first source of fluid under pressure, said rear chamber being connected to a second source of fluid under pressure higher than said first pressure, said flexible portion being adapted to move in response to expansion of said fluid with changes in temperature in said first mode to maintain the constant hydraulic fluid pressure on the spring brake within a predetermined range;
a cylinder having an internal bore with an inlet port and an outlet port, said inlet port being connected to a reservoir containing hydraulic fluid, said outlet port being connected by a conduit to said spring brake means;
piston means connected to said wall means and extending into the internal bore of said cylinder;
poppet means attached to said piston means for preventing communication between said reservoir and said bore during said first mode of operation and for allowing communication therebetween during said second mode of operation;
resilient means located in said front chamber for urging said wall means toward said rear chamber during said second mode of operation;
a second housing having a first chamber connected to said front chamber, a second chamber connected to said rear chamber and a control chamber interconnected to said first and second chambers;
valve means located in said control chamber having a tubular shaft surrounded by a diaphragm for separating the second chamber fron the control chamber and a tubular valve stem extending through the second housing from the first chamber into the control chamber, said tubular housing having a resiliently positioned closure member on the end thereof adjacent said tubular shaft;

sensing means located in said second housing and connected to said second chamber for visually indicating a differential pressure capable of being produced across said wall means in said first mode of operation;

flow control means connected to said second chamber of the second housing and the front chamber of the first housing for maintaining said first source of fluid under pressure communicated thereto at a constant pressure during both the first and second modes of operation;

means responsive to the hydraulic fluid pressure being supplied to said spring brake means during said first mode of operation for transmitting a first signal to an indicator device to inform the operator that the spring brakes are released and for transmitting a second signal during said second mode of operation to inform the operator that the spring brakes are applied and need to be released before movement of the vehicle; and manual control means connected to said tubular valve stem for selectively engaging said closure member with said tubular shaft in response to an operator for sequentially communicating said first and second chambers with said control chamber to develop a corresponding pressure differential across said wall means to move said piston means in the internal bore of the cylinder and sufficiently pressurize the hydraulic fluid therein by a single stroke to establish said first mode of operation.

2. The power braking system, as recited in claim 1, wherein said first source of fluid under pressure is a partial vacuum and said second source of fluid is air at atmospheric pressure, said partial vacuum being connected to said first inlet port and said front chamber, said air at atmospheric pressure being connected to said second inlet port, said valve means in the first operational mode permitting partial vacuum to be communicated from the first inlet port past the outlet port and into the rear chamber to eliminate the pressure differential across the wall means and release the pressurizing force on the hydraulic fluid to allow the spring brakes to be applied.

3. The power braking system, as recited in claim 2, wherein said valve means in the second operational mode permits air at atmospheric pressure to pass through said second inlet port into the rear chamber to create an operational pressure differential which causes the wall means to move and pressurize the hydraulic fluid, said pressurized fluid releasing said spring brakes from the applied position.

* * * * *